United States Patent
Van Mullen et al.

[11] Patent Number: 5,415,445
[45] Date of Patent: May 16, 1995

[54] HANDLE FOR A TRAILER BALL-MOUNT

[76] Inventors: Daniel Van Mullen; Doris Van Mullen, both of 4725 - 12 Mile, Sparta, Mich. 49345

[21] Appl. No.: 182,720

[22] Filed: Jan. 18, 1994

Related U.S. Application Data

[63] Continuation of Ser. No. 962,139, Oct. 16, 1992, Pat. No. 5,350,209.

[51] Int. Cl.⁶ ............................................. B65G 7/12
[52] U.S. Cl. .................................. 294/16; 294/90; 294/145
[58] Field of Search .................. 294/15, 16, 26, 28, 294/90, 91, 137, 145, 165; 280/416.1, 507, 511-513; 81/3.8, 53.11, 487, 488

[56] References Cited

U.S. PATENT DOCUMENTS

| | | | |
|---|---|---|---|
| 1,298,662 | 4/1919 | Chadwick | 294/91 X |
| 1,656,582 | 1/1928 | Harder | 294/91 |
| 2,528,947 | 11/1950 | Copeman | 294/19.1 X |
| 2,613,948 | 10/1952 | Klein | 280/512 |
| 2,833,564 | 5/1958 | Brown | 280/512 |
| 2,874,976 | 2/1959 | Linn | 280/512 |
| 3,012,797 | 12/1961 | Manting | 280/511 X |
| 3,228,445 | 1/1966 | Mayotte | 280/507 X |
| 3,376,051 | 4/1968 | Bacher | 280/512 |
| 4,645,224 | 2/1987 | Poganski | 294/15 X |
| 4,864,899 | 9/1989 | Morse | 81/53.11 |

FOREIGN PATENT DOCUMENTS

| | | | |
|---|---|---|---|
| 2236514 | 4/1991 | United Kingdom | 280/507 |
| 1451054 | 1/1989 | U.S.S.R. | 280/507 |

*Primary Examiner*—Dean J. Kramer
*Attorney, Agent, or Firm*—Waters & Morse

[57] ABSTRACT

A gripping device provided with handles is adapted to engage the ball of a conventional trailer hitch as a convenience in handling the hitch when it is removed from the towing vehicle. The preferred form of the device provides a clam shell-type grasping assembly that is manipulated by handles having overlapped portions that together form the handle. These overlapped portions are locked releasably against separation, and accommodation is also provided for receiving a padlock maintaining the closure of the clam shell components whenever this becomes desirable. A simplified version of the device is formed by a piece of bent rod having portions providing the handle and also for gripping the ball.

1 Claim, 4 Drawing Sheets

HANDLE FOR A TRAILER BALL-MOUNT

This is a continuation of Ser. No. 07/962,139 filed on Oct. 16, 1992, now U.S. Pat. No. 5,350,209.

BACKGROUND OF THE INVENTION

The development of the design of house trailers has resulted in such increased size and weight that special attention has had to be applied to the hitches that connect them to the towing vehicle. The so-called "equalizing hitch" has evolved in response to the need to control the weight added to the rear wheels of the vehicle. These hitches are sufficiently massive that it is not desirable to leave them mounted on the vehicle when the hitch is not in use. Prevention of theft is also a concern. The exterior configuration is a bit awkward to grasp and manipulate directly by hand. The weight can come to around 60 pounds, and the surfaces of the device are often contaminated with dirt and grease. The present invention provides a practical solution to this problem.

SUMMARY OF THE INVENTION

A handle of convenient size is provided with means for grasping the conventional ball of a trailer hitch so that the hitch assembly can be manipulated conveniently when it is removed from the towing vehicle. In the preferred form of the invention, the grasping device associated with the handle is a clam shell assembly that grasps the ball, but leaves an opening for the stem connecting the ball to the hitch structure. Once the grasping device is locked in engagement, the handle forms a convenient arrangement for carrying the hitch to a place of storage, and for retrieving it for re-attachment to the towing vehicle. The components of the clam shell device are each attached to gripping handles that are manipulated together, somewhat in the manner of ice tongs. The clam shell is locked by devices interconnecting these components so that they cannot separate and release the Grip of the clam shell. Provision is also made for receiving a padlock in aligned openings in lateral extensions of the clam shell device. In a modified form of the invention, a piece of bent rod is provided with a hook section engageable with the stem of the ball, but adapted to retain the ball itself. This rod is provided with extensions from the hook to form a handle.

DESCRIPTION OF THE PREFERRED EMBODIMENTS

Figure 8:
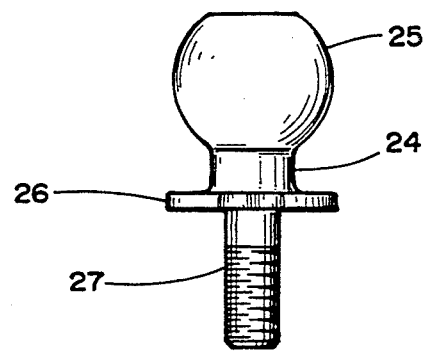
FIG. 8 is an elevation of a conventional ball fitting associated with a trailer hitch.

Referring to FIGS. 1–4, the generally hemispherical components 20 and 21 are hinged together at 22 to form a clam shell-type gripping device. The components 20 and 21 are formed so that they together define an opening 23 that receives the stem 24 (see FIG. 8) connecting the ball 25 to the mounting flange 26 and the threaded bolt extension 27, which provides the conventional arrangement for securing the ball to the weldment constituting the frame of the hitch. This weldment is conventional, and is commonly referred to as the "ball section of a trailer hitch". It is shown in FIG. 10, and includes a beam attachable to and removable from a towing vehicle, and carries a mounting for the ball unit.

Figure 10:
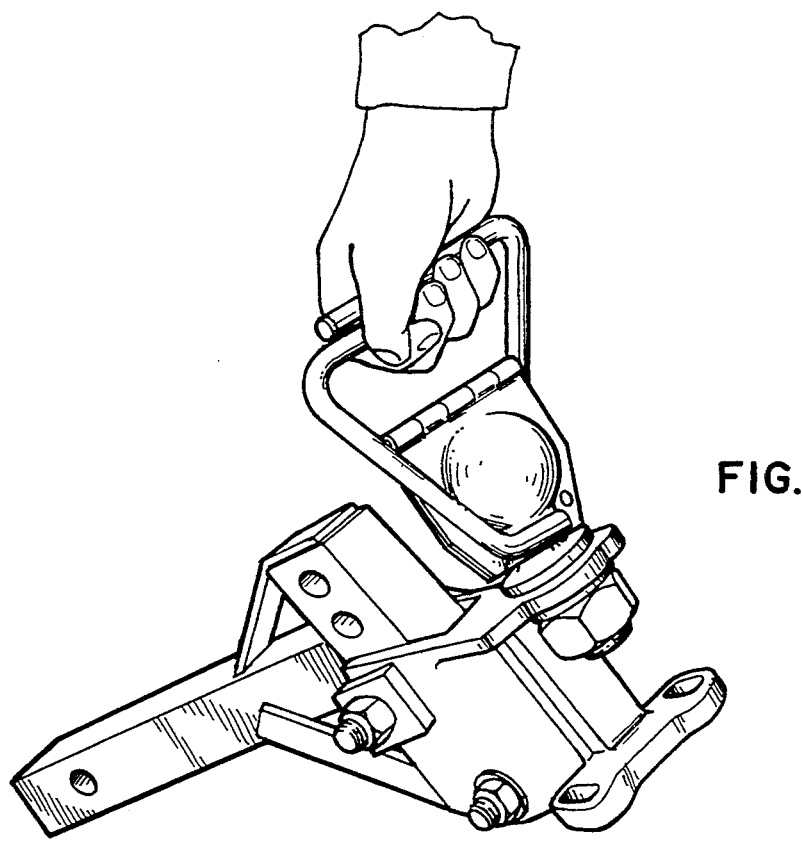
FIG. 10 is a perspective view of the engaged position of the device on a trailer hitch that has been removed from the towing vehicle.

Pieces of bent rod 28 and 29 are welded to the clam shell components 20 and 21, respectively, and these members have the overlapped portions 30 and 31 which form the handle with which an engaged hitch can be manipulated, as shown in FIG. 10. In the modification shown in FIGS. 1–4, the closed position of the device can be locked by swinging the latch 32 from the clockwise dotted position appearing in FIG. 1 to the full line position, in which the handle section 31 is entrapped between the opposite sides of the latch 32. The portion 33 of the latch serves to structurally interconnect the sides, so that they function together as they are pivoted on the pin 34 traversing the handle portion 30. The latch is easily disengageable by shoving the portion 33 with the thumb or finger, thus releasing the portions 30 and 31 of the handle so that they can move independently. When it is desired to semi-permanently lock the closed position of the device, a small padlock can be worked thru the aligned openings 35 in the lateral extensions from the clam shell components 20 and 21, with the precaution being taken that the configuration of the padlock does not permit a sufficient opening of the clam shell device to release the ball.

Figure 2:
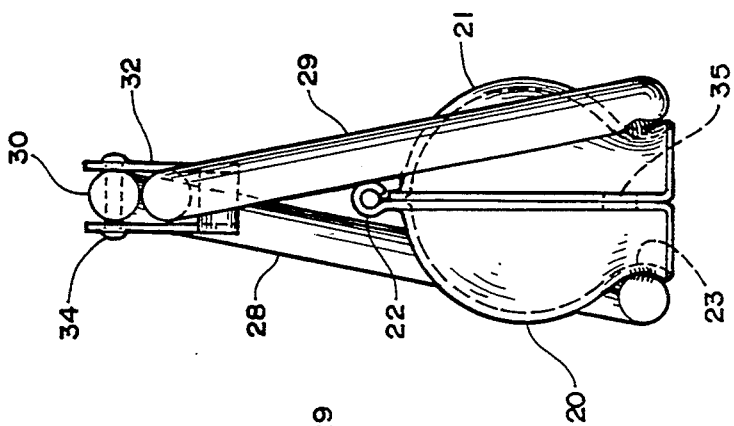
FIG. 2 is a side elevation with respect to FIG. 1.
Figure 4:
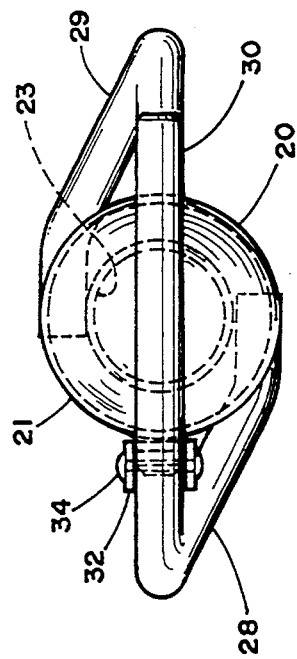
FIG. 4 is a top view with respect to FIG. 1.
Figure 1:
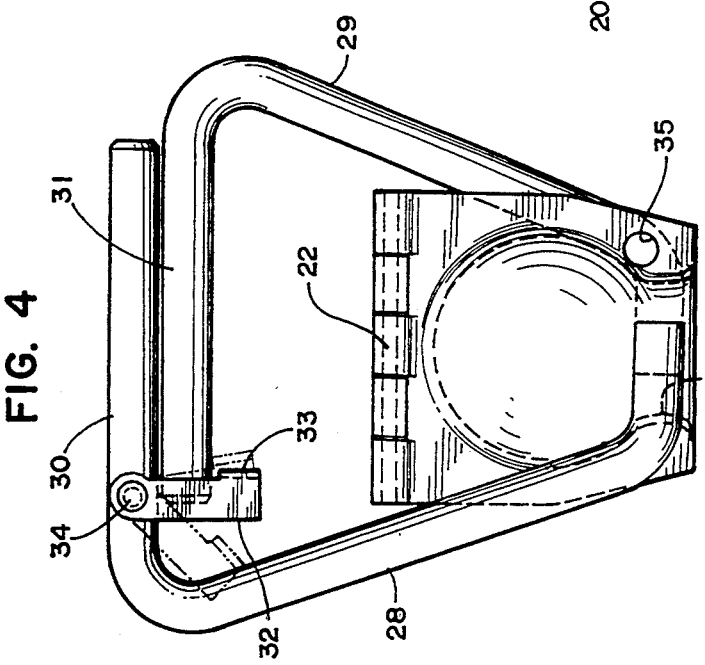
FIG. 1 is an elevation of the preferred form of the invention in the closed and locked position, as it would be in engagement with a ball of a trailer hitch.
Figure 3:
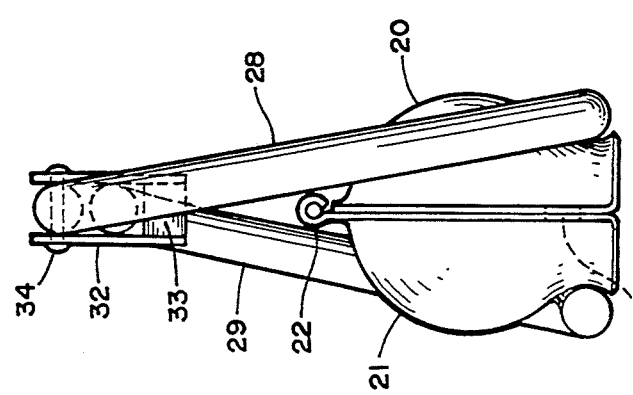
FIG. 3 is an opposite side elevation with respect to FIG. 1.
Figure 6:
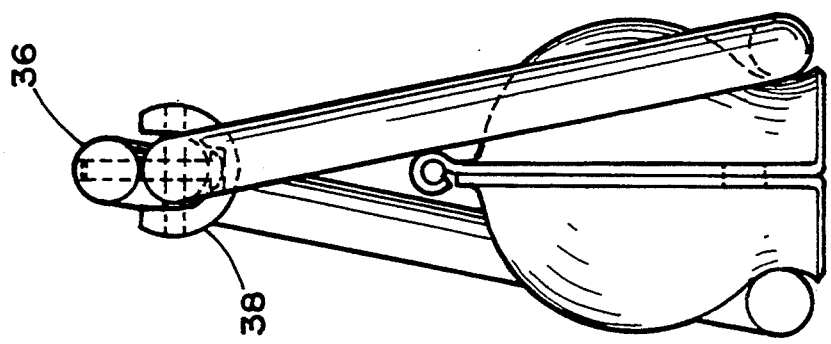
FIG. 6 is a side elevation with respect to FIG. 5.
Figure 5:
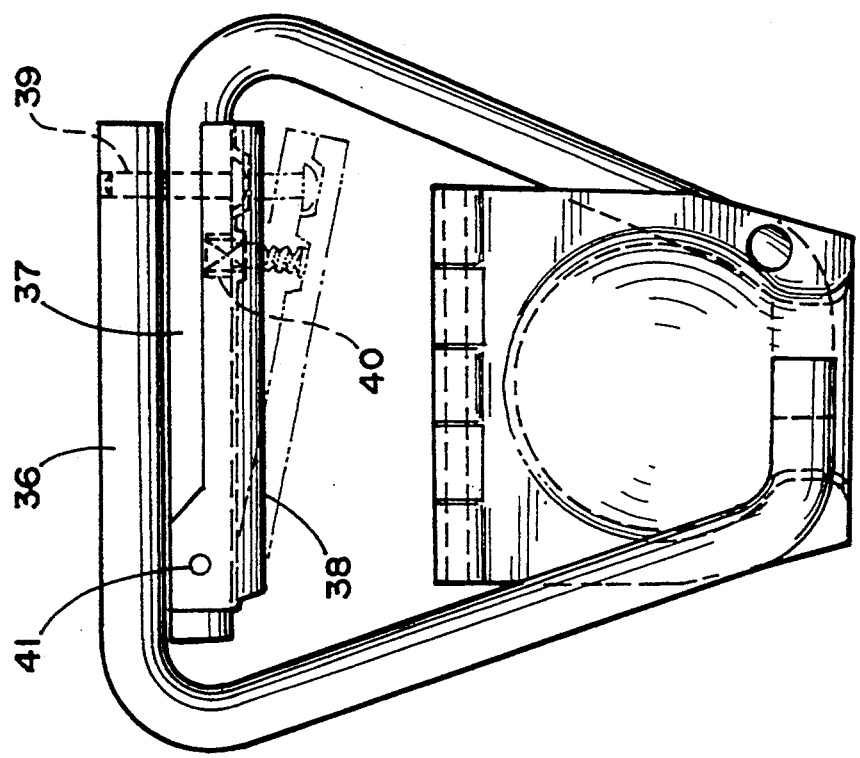
FIG. 5 is an elevation of a modified form of the invention with respect to the locking device.

FIGS. 5 and 6 illustrate a modification of the invention, in which the handle sections 36 and 37 of the clam shell device are held together by a lever 38 controlling a pin 39 adapted to traverse aligned openings in the handle sections 36 and 37. A spring 40 biases the latch 38 to the dotted line position shown in FIG. 5, permitting the pin 39 to drop to a position releasing the handle sections 36 and 37 to move independently. The clam shell device itself is otherwise exactly as previously described. The latch 38 is preferably pinned to the handle section 37 at 41, with freedom to rotate between the two positions illustrated in FIG. 5. When the unit is gripped as shown in FIG. 10, the pressure of the hand against the underside of the latch 38 appearing in FIGS. 5 and 6 will deflect the spring 40, and maintain the closed position of the clam shell.

Figure 7:
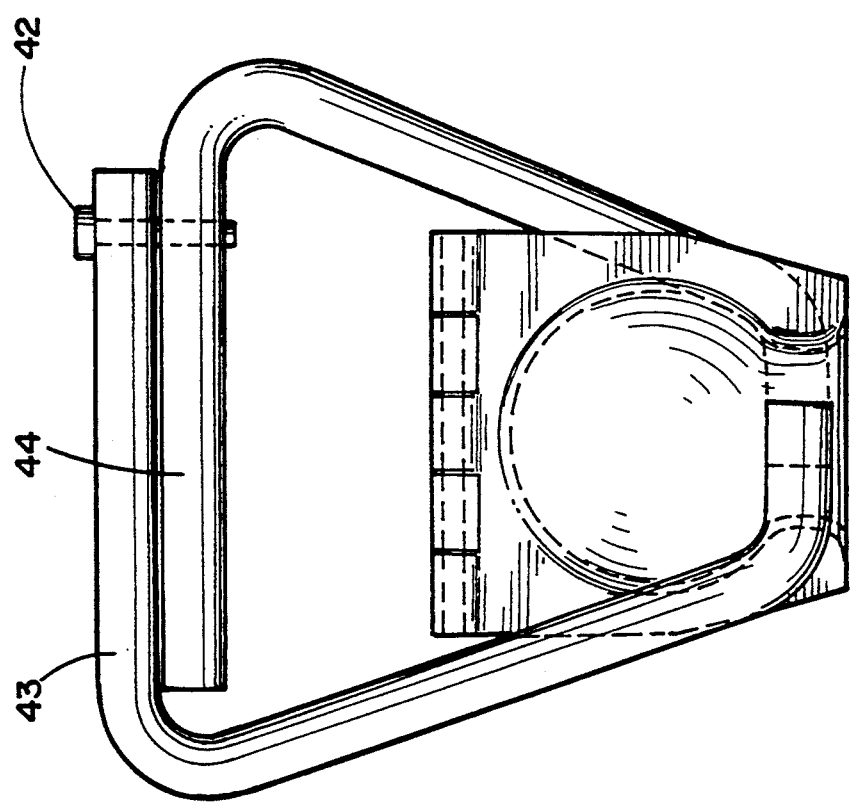
FIG. 7 is an elevation of a further modification of the invention with respect to the locking device.

Referring to FIG. 7, a further modification of the invention is illustrated in which the locking action is provided by a simple removable pin 42 adapted to traverse aligned openings in the handle sections 43 and 44. The pin 42 is merely removed when it is desired to release the clam shell device from the ball, or to engage the ball.

Figure 9:
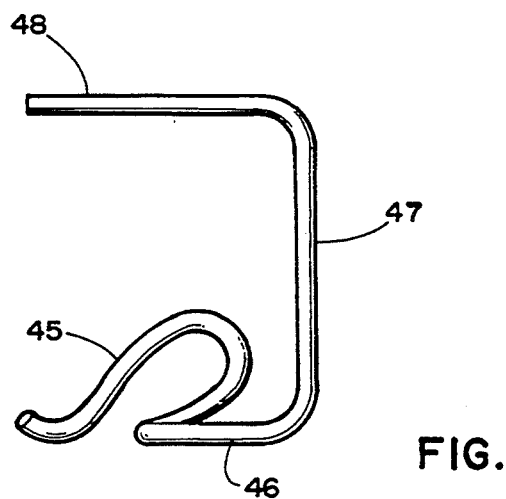
FIG. 9 is a perspective view of a modified form of the invention provided by a single piece of bent rod.

Referring to FIG. 9, a further modification of the device replaces the clam shell grasping assembly with a configuration of bent steel rod. A hooked portion 45 is formed in the rod with a sufficient gap to receive the stem 24 of the ball unit shown in FIG. 8. This gap, however, is too small to permit the ball 25 to escape. A lateral extension 46 from one side of the hook 45 permits the angular offset 47 to clear the ball 25 when the unit is held by the handle 48. A device of this type is preferably formed from bent steel rod at least a half inch in diameter, in order to provide a comfortable grip at the handle 48, in view of the significant weight of the entire hitch assembly shown in FIG. 10.

We claim:

1. A method of handling the ball section of a trailer hitch, said section being removably mounted on a towing vehicle, and including a beam engageable with and removable from said vehicle, said beam carrying a ball projection, comprising:

engaging said ball projection with a receptacle having a handle; and detaching said ball section from said vehicle, and manipulating said ball section and receptacle as a unit by grasping said handle.

* * * * *